Feb. 4, 1964 J. F. SHEEHAN 3,120,615

SYSTEM FOR PRODUCING MAGNETIZATION PATTERNS
UPON A MAGNETIC RECORDING MEDIUM

Filed July 16, 1958

INVENTOR.
JOHN F. SHEEHAN

BY Richard G. Stahr
ATTORNEY

United States Patent Office 3,120,615
Patented Feb. 4, 1964

3,120,615

SYSTEM FOR PRODUCING MAGNETIZATION PATTERNS UPON A MAGNETIC RECORDING MEDIUM

John F. Sheehan, Rochester, N.Y., assignor to General Dynamics Corporation, Rochester, N.Y., a corporation of Delaware Filed July 16, 1958, Ser. No. 748,947
2 Claims. (Cl. 307—88.5)

Figure 1:
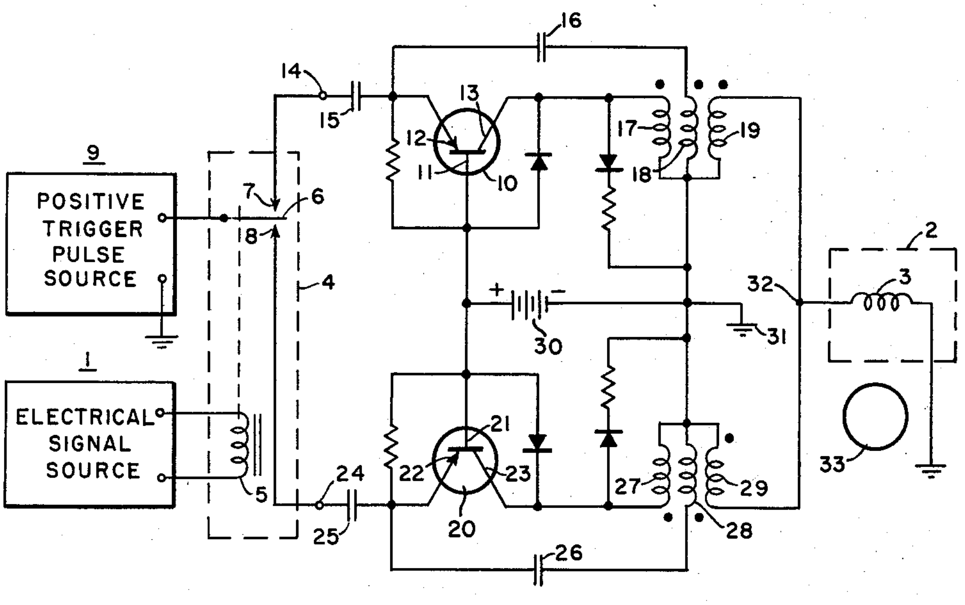

This invention relates to data storage devices and, more specifically, to a pulse generator for producing magnetization patterns upon a magnetic recording medium.

Various techniques have been devised for the storage and subsequent readout or altering of a magnetic flux indicia, usually representing binary data, in magnetization patterns along a track upon a magnetizable medium by placing the coil of an electromagnetic recording device in operative arrangement with the medium and energizing the coil with a flow of current. In these techniques, the magnetic flux lines of each magnetization pattern on the recording medium may be parallel or transverse to the direction of relative motion between the coil and the recording medium.

While the electrical signals corresponding to the two binary information bits "1" and "0," usually employed to represent data in binary form, are generally the presence of an electrical pulse for either one and the absence of an electrical pulse for the other in most binary data systems, it has been found that this "uni-polar" method of representing binary data is not satisfactory with the storage and readout techniques in that previously recorded magnetization patterns must be erased before new information may be stored on the same track of the recording medium. Therefore, a return-to-zero recording technique, has been proposed wherein the recorded magnetization patterns are discrete even though a series of magnetization patterns along a track happen to be of the same information bits, that is, a series of "1" or "0" bits. With this method, therefore, a magnetization pattern of one direction is thought of as corresponding to either polarity binary information bits while a magnetization pattern of the opposite direction is thought of as corresponding to the other polarity binary information bits. Since saturation techniques are employed, the act of producing either magnetization pattern has the effect of not only establishing that magnetization pattern but also erasing the previous magnetic pattern, thereby eliminating the objection of erasing before re-recording, which is necessary with the "uni-polar" method of representing binary data.

To produce the two different magnetization patterns, corresponding to respective polarity binary information bits, prior art devices have employed elaborate and complex switching systems to control the direction of the flow of energizing current through the coil of the electromagnetic recording device whereby the two different magnetization patterns of opposing directions may be produced. These systems have proven objectionable in that they have required considerable maintenance attention and the waveforms of the energizing current have been something less than ideal.

It is, therefore, an object of this invention to provide an improved pulse generator for producing magnetization patterns upon a magnetic recording medium.

It is another object of this invention to provide an improved pulse generator for producing magnetization patterns upon a magnetic recording medium wherein the energizing current which produces the magnetization patterns may be generated in opposing directions thereby reducing the switching requirements to a minimum.

It is another object of this invention to provide a system for producing magnetization patterns upon a magnetic recording medium in which the requirement for switching the energizing current is completely eliminated.

In accordance with this invention, a pulse generator is provided for producing upon a magnetic recording medium two magnetization patterns of opposite directions, respectively corresponding to opposite polarity electrical signals to be recorded, wherein a circuit which is sensitive to the polarity of the electrical signals to be recorded directs a trigger signal of a preselected polarity, for each electrical signal, to either one of two circuits which, when triggered respectively produce opposite polarity potential pulses and which are arranged to coact with each other in such a manner that the potential pulse produced by either one of the two circuits produces an auxiliary trigger signal for the other of the two circuits of the preselected polarity to which it is responsive. Depending upon which circuit is initially triggered, two different resultant potential waveforms which are 180° out of phase with each other are produced in an output circuit common to both. The coil of an electromagnetic recording device is interconnected in the common output circuit in such a manner that the current produced by the resultant potential waveform flows therethrough, producing either one of the two magnetization patterns upon a recording medium with which it is arranged in operative relationship.

Figure 2:
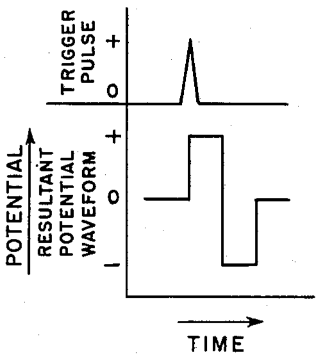
Figure 3:
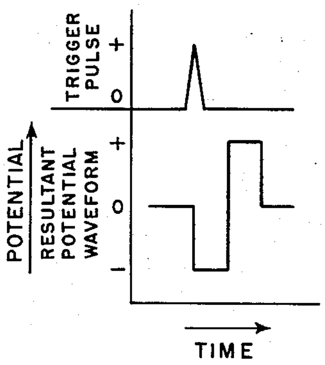

For a better understanding of the present invention, together with further objects, advantages and features thereof, reference is made to the following description and accompanying drawings, in which:

FIGURE 1 illustrates a preferred embodiment of this invention; and,

FIGURES 2 and 3 graphically illustrate the potential waveforms produced in the circuit as shown in FIGURE 1.

Referring now to FIGURE 1 of the drawing, a source of electrical signals, the details of which form no part of this invention, is illustrated in block form at 1. A coil 3 of an electromagnetic recording device 2 is located in operative arrangement with a magnetic recording medium, for example, a magnetic drum, which, since it forms no part of this invention, is indicated by a circle at 33, for producing thereon magnetization patterns of opposite directions, corresponding to respective polarity electrical signals to be recorded, when energized by a flow of energizing current therethrough.

To obtain magnetization patterns of opposite directions, the direction of the flow of energizing current through coil 3 which produces either pattern must be relatively reversed to produce the other. In the system of this invention, either one of two potential waveforms which are 180° out of phase with each other may be produced by the pulse generator which creates the required energizing current. To do this, two blocking oscillator circuits which produce respective potential pulses of opposite polarity when triggered by a signal of a preselected polarity and which are arranged to coact in such a manner that the potential pulse produced by either produces an auxiliary trigger signal for the other of the preselected polarity to which it is responsive are employed. One of these blocking oscillator circuits comprises transistor 10, an individual input circuit consisting of terminal 14 and capacitor 15, capacitor 16, and magnetically coupled coils 17, 18 and 19. The other blocking oscillator circuit comprises transistor 20, an individual input circuit consisting of terminal 24 and capacitor 25, capacitor 26, and magnetically coupled coils 27, 28 and 29. Coils 17, 18 and 19 and coils 27, 28 and 29 may be pulse transformers. To provide the proper bias potentials for these two circuits, a common source of operating potential is provided and is indicated at 30.

In the quiescent state, neither transistor 10 or 20 which are preferably of the P-N-P type will be conducting in that their respective bases 11 and 21 are more positive than their respective emitters 12 and 22, a condition which does not satisfy the base-emitter bias requirements for conduction through type P-N-P transistors.

To render either transistor 10 or transistor 20 conductive, a trigger signal of the proper polarity, in this instance, positive, must be applied to the respective individual input circuit from source 9. A short positive trigger signal applied to terminal 14 of the individual input circuit for transistor 10, of sufficient magnitude to render the emitter 12 more positive than the base 11, will produce conduction therein. As transistor 10 begins conduction, the emitter-collector current flowing through coil 17 produces a magnetic field which induces a potential in coil 18. The end of coil 17 which is opposite point-of-reference potential 31 is positive-going and coil 18 is so poled that the potential induced therein is also positive-going at the end opposite point-of-reference potential 31. This positive-going potential is applied, through capacitor 16, to the emitter 12 of transistor 10 and, being positive, tends to maintain conduction through transistor 10 after the trigger signal has been removed from terminal 14. At the same time that the magnetic field produced by the emitter-collector current flow through coil 17 induces a potential in coil 18, it also induces a potential in coil 19 which is so poled that the potential induced therein is also positive-going at the end opposite the point-of-reference potential 31. As the charge upon capacitor 16 decays, thereby removing the positive potential from emitter 12 of transistor 10, transistor 10 becomes non-conductive, interrupting the emitter-collector current flow. As the emitter-collector current flow is interrupted, the magnetic field surrounding coil 17 collapses, which induces a potential in coil 18 which is now negative-going at the end opposite point-of-reference potential 31. This negative-going potential is applied to the emitter 12 of transistor 10 through capacitor 16, thereby holding transistor 10 non-conductive. At the same time, the collapsing magnetic field surrounding coil 17 induces a potential in coil 19 which is negative-going at the end opposite point-of-reference potential 31 and which returns to zero as transistor 10 is held non-conductive. In this manner, transistor 10 produces a positive polarity pulse in coil 19 which begins at zero and returns to zero.

As conduction is produced in transistor 20 through the application of a short positive trigger signal to terminal 24 of its individual input circuit, the emitter-collector current flowing through coil 27 produces a magnetic field which induces a potential in coil 28. The end of coil 27 which is opposite point-of-reference potential 31 is positive-going and coil 28 is so poled that the potential induced therein is also positive-going at the end opposite point-of-reference potential 31. This positive-going potential is applied, through capacitor 26, to the emitter 22 of transistor 20 and, being positive, tends to maintain conduction through transistor 20 after the trigger signal has been removed from terminal 24. At the same time, the magnetic field surrounding coil 27 also induces a potential in coil 29 which is so poled that the end opposite point-of-reference potential 31 is negative-going. As the charge upon capacitor 26 decays to a point which renders transistor 20 non-conductive, the emitter-collector current flow is interrupted. As the emitter-collector current flow is interrupted, the magnetic field surrounding coil 27 collapses thereby inducing a potential in coil 28 which is negative-going at the end opposite point-of-reference potential 31. This negative potential when applied to the emitter 22 of transistor 20 through capacitor 26 holds transistor 20 non-conductive. At the same time, the collapsing magnetic field surrounding coil 27 induces a potential in coil 29 which is positive-going at the end opposite point-of-reference potential 31 and which returns to zero as transistor 20 is held non-conductive. In this manner, transistor 20 produces a negative polarity pulse in coil 29 which begins at zero and returns to zero.

By connecting the respective ends of coils 19 and 29 which are opposite point-of-reference potential 31 to a common output terminal 32, the two circuits hereinbefore described may be rendered coactive in that the pulse produced by either also produces an auxiliary trigger pulse which is applied to the other in the polarity sense which will render the other conductive. Assuming that transistor 10 has just ceased conduction after having been triggered by a short positive signal applied to terminal 14, the collapsing magnetic field surrounding coil 17 induces a potential in coil 19 which is negative-going at the end opposite point-of-reference potential 31. At this time, the end of coil 29 opposite point-of-reference potential 31 is also negative-going and the current flow produced thereby creates a magnetic field surrounding coil 29, inducing a potential in coil 28 which is so poled that the potential induced therein is positive-going at the end opposite point-of-reference potential 31. This positive auxiliary trigger pulse is applied to the emitter 22 of transistor 20 through capacitor 26 and is of sufficient magnitude to render emitter 22 more positive than the base 21, thereby creating conduction through transistor 20 which produces a negative polarity pulse in a manner as hereinbefore described. The positive-going potential induced in coil 29 by the collapsing magnetic field surrounding coil 27 as transistor 20 ceases conduction will not retrigger transistor 10 at this time in that transistor 10 has not recovered from its initial condition of conduction.

Similarly, had transistor 20 been triggered by a short positive signal applied to terminal 24 and has just ceased conduction, the collapsing magnetic field surrounding coil 27 induces a potential in coil 29 which is positive-going at the end opposite point-of-reference potential 31. At this time, the end of coil 19 opposite point-of-reference potential 31 is also positive-going and the current flow produced thereby creates a magnetic field surrounding coil 19, inducing a potential in coil 18 which is so poled that the potential induced therein is also positive-going at the end opposite point-of-reference potential 31. This positive auxiliary trigger pulse is applied to emitter 12 of transistor 10 through capacitor 16 and is of sufficient magnitude to render emitter 12 more positive than base 11, thereby creating conduction through transistor 10 which produces a positive polarity pulse in a manner as hereinbefore described. The negative-going potential induced in coil 19 by the collapsing magnetic field surrounding coil 17 as transistor 10 ceases conduction will not retrigger transistor 20 at this time in that transistor 20 has not recovered from its initial condition of conduction.

Point-of-reference potential 31 and output terminal 32 comprise a common output circuit across which either one of two potential waveforms, 180° out of phase with each other, may appear dependent upon which transistor 10 or 20 is initially triggered. This potential waveform is the resultant obtained through the combination of the individual opposite polarity potential pulses produced by the circuitry associated with respective transistors 10 and 20.

Referring now to FIGURE 2, which graphically illustrates the resultant potential waveform appearing across point-of-reference pontential 31 and common output terminal 32 when transistor 10 is initially triggered, the potential, with respect to ground, at terminal 32 is ground or zero when the circuit of this invention is in its quiescent state, as shown. Assuming that a short positive trigger pulse of sufficient magnitude to produce conduction in transistor 10 is applied to terminal 14, a potential is induced in coil 19 which is initially positive-going at the end opposite point-of-reference potential 31, in a manner as has previously been described. Therefore, the potential, with respect to ground, of terminal 32 will be initially positive-going and will continue positive-going until it attains the maximum positive magnitude of the potential induced in coil 19 where it remains substantially constant during the period transistor 10 is conducting, as shown. As transistor 10 ceases conduction, the collapsing magnetic field surrounding coil 17 induces a potential in coil 19 which is negative-going at the end opposite point-of-reference potential 31, therefore, the potential, in respect to ground, of terminal 32 is also negative-going at this time. As the magnetic field surrounding coil 17 dissipates, the potential of the end of coil 19 opposite point-of-reference potential 31 and also terminal 32 continues negative-going and returns to ground or zero potential, as shown. However, since the negative-going potential induced in coil 19 produces an auxiliary trigger pulse which fires transistor 20, in a manner as has previously been described, transistor 20 begins conduction at this time, thereby inducing a potential in coil 29 which is initially negative-going at the end opposite point-of-reference potential 31. Therefore, the potential, with respect to ground, of terminal 32 continues through zero in the negative direction to the maximum magnitude of the negative-going potential induced in coil 29 where it remains substantially constant during the period of conduction of transistor 20. As transistor 20 ceases conduction, the collapsing magnetic field surrounding coil 27 induces a potential in coil 29 which is now positive-going at the end opposite point-of-reference potential 31. Therefore, the potential, with respect to ground, of terminal 32 is also positive-going. As the collapsing magnetic field surrounding coil 27 dissipates, the potential of the end of coil 29 opposite point-of-reference potential 31 and also terminal 32 continues positive-going and returns to ground or zero potential where it remains until either transistor 10 or transistor 20 is again initially triggered.

The potential waveform appearing across point-of-reference potential 31 and common output terminal 32 in the event transistor 20 is initially triggered is graphically illustrated by FIGURE 3. Assuming that a short positive trigger pulse of sufficient magnitude to produce conduction in transistor 20 is applied to terminal 24, a potential is induced in coil 29 which is initially negative-going at the end opposite point-of-reference potential 31, in a manner as has previously been described. Therefore, the potential, with respect to ground, of terminal 32 will be initially negative-going and will continue negative-going until it attains the maximum negative magnitude of the potential induced in coil 29 where it remains substantially constant during the period transistor 20 is conducting. As transistor 20 ceases conduction, the collapsing magnetic field surrounding coil 27 induces a potential in coil 29 which is positive-going at the end opposite point-of-reference potential 31, therefore, the potential, in respect to ground, of terminal 32 is also positive-going at this time. As the magnetic field surrounding coil 27 dissipates, the potential of the end of coil 29 opposite point-of-reference potential 31 and also terminal 32 continues positive-going and returns to ground or zero potential. However, since the positive-going potential induced in coil 29 produces an auxiliary trigger pulse which fires transistor 10, transistor 10 begins conducting at this time, thereby inducing a potential in coil 19 which is initially positive-going at the end opposite point-of-reference potential 31. Therefore, the potential, in respect to ground, of terminal 32 continues through zero in the positive direction to the maximum magnitude of the positive-going potential induced in coil 19 where it remains substantially constant during the period of conduction of transistor 10. As transistor 10 ceases conduction, the collapsing magnetic field surrounding coil 17 induces a potential in coil 19 which is now negative-going at the end opposite point-of-reference potential 31. Therefore, the potential, in respect to ground, of terminal 32 is also negative-going at this time. As the collapsing magnetic field surrounding coil 17 dissipates, the potential of the end of coil 19 opposite point-of-reference potential 31 and also terminal 32 continues negative-going and returns to ground or zero potential where it remains until either transistor 10 or transistor 20 is again triggered.

Either of these resultant potential waveforms may be employed to produce a magnetization pattern upon a recording medium which corresponds to either polarity of the electrical signal to be recorded while the other resultant potential waveform may be employed to produce a magnetization pattern upon the recording medium which corresponds to the other polarity electrical signals to be recorded.

So that either transistor 10 or transistor 20 may be initially triggered by the proper polarity input signal, a circuit which is sensitive to the polarity of electrical signals to be stored is indicated as an electromagnetic relay at 4 and consists of a coil 5, movable contact 6 and stationary contacts 7 and 8. While this polarity sensitive circuit has herein been illustrated as a relay, it is to be specifically understood that any switching device adaptable to perform the required function may be substituted therefor. Coil 5 is indicated as being connected to the source of electrical signals 1. As coil 5 is energized in one direction by the incoming signal of either polarity, movable contact 6 engages stationary contact 7, connecting a source of positive trigger pulses which may be any well known pulse source, the details of which form no part of this invention and is indicated in block form at 9, to the input terminal 14 of transistor 10. Upon receipt of an incoming signal of the opposite polarity, coil 5 is energized in the opposite direction and movable contact 6 engages stationary contact 8, thereby connecting trigger signal source 9 to input terminal 24 of transistor 20. In this manner, then, the trigger signals may be directed to the input circuit of either transistor for electrical signals of either polarity or to the input circuit of the other transistor for electrical signals of the other polarity.

The coil 3 of a magnetic recording device 2 is connected across the common output circuit point-of-reference potential 31 and common output terminal 32, of the circuit of this invention. The resultant potential waveforms appearing across this common output circuit, in a manner as has previously been described, produces a flow of energizing current through coil 3. As energizing current flows through coil 3, magnetization patterns are induced upon an electromagnetic recording medium, not shown.

While a preferred embodiment of the present invention has been shown and described, it is to be understood that various modifications and substitutions may be made without departing from the spirit of the invention which is to be limited only within the scope of the appended claims.

What is claimed is:

1. Apparatus comprising a first blocking oscillator including a first unilaterally-conducting amplifying device having an input circuit and an output circuit, first biasing means coupled to said first device for rendering said first device normally cutoff, a first transformer having first, second and third windings, first time constant means having a given time constant, said first winding of said first transformer being coupled to the output circuit of said first device, said second winding of said first transformer being coupled to the input circuit of said first device through said first time constant means, said second winding of said first transformer being poled with respect to said first winding thereof to provide positive feedback between the output and input circuits of said first device, whereby a first output pulse of given absolute amplitude and given duration is induced in said third winding of said first transformer in response to a trigger pulse of given polarity being applied to said input circuit of said first device, one end of said third winding of said first transformer being connected to a point of reference potential and said third winding of said first transformer being poled with respect to said first and second windings thereof to provide a predetermined polarity for said first output pulse appearing at the other end of said third winding of said first transformer; a second blocking oscillator including a second unilaterally-conducting amplifying device having an input circuit and an output circuit, second biasing means coupled to said second device for rendering said second device normaly cutoff, a second transformer having first, second and third windings, second time constant means having said given time constant, said first winding of said second transformer being coupled to the output circuit of said second device, said second winding of said second transformer being coupled to the input circuit of said second device through said second time constant means, said second winding of said second transformer being poled with respect to the first winding thereof to provide positive feedback between the output and input circuits of said second device whereby a second output pulse of said given absolute amplitude and said given duration is induced in said third winding of said second transformer in response to a trigger pulse of said given polarity being applied to said input circuit of said second device, one end of said third winding of said second transformer being connected to said point of reference potential and said third winding of said second transformer being poled with respect to said first and second windings thereof to provide a polarity opposite to said predetermined polarity for said second output pulse appearing at the other end of said third winding of said second transformer; said other ends of said third windings of said first and second transformer being connected to each other; load means having one end thereof connected to said point of reference potential and the other end thereof connected to said other ends of said third windings of said first and second transformers, and means for selectively applying said trigger pulse of given polarity to the input circuit of said first device or the input circuit of said second device, said given time constant being sufficient to provide a recovery time interval for each of said first and second blocking oscillators which is greater than twice said given duration.

2. The apparatus defined in claim 1, wherein said load means comprises a recording coil in cooperative relationship with a movable magnetic recording medium.

References Cited in the file of this patent

UNITED STATES PATENTS

| | | |
|---|---|---|
| 2,585,722 | Baird | Feb. 12, 1952 |
| 2,691,077 | Koros | Oct. 5, 1954 |
| 2,708,241 | Bess | May 10, 1955 |
| 2,734,186 | Williams | Feb. 7, 1956 |
| 2,748,274 | Pearlman | May 29, 1956 |
| 2,783,384 | Bright et al. | Feb. 26, 1957 |
| 2,845,610 | Cornell et al. | July 29, 1958 |
| 2,849,614 | Royer et al. | Aug. 26, 1958 |
| 2,853,357 | Barber | Sept. 23, 1958 |
| 2,898,479 | McElroy | Aug. 4, 1959 |
| 2,903,602 | Fleisher | Sept. 8, 1959 |
| 2,954,267 | Canepa | Sept. 27, 1960 |
| 2,994,840 | Dorsman | Aug. 1, 1961 |